United States Patent [19]

Ozaki et al.

[11] 4,278,412
[45] Jul. 14, 1981

[54] EXTRUSION DIE ASSEMBLY FOR FORMING HONEYCOMB STRUCTURES

[75] Inventors: Sei Ozaki, Nagoya; Shuichi Otsu, Konan, both of Japan

[73] Assignee: NGK Insulators, Ltd., Nagoya, Japan

[21] Appl. No.: 47,864

[22] Filed: Jun. 12, 1979

Related U.S. Application Data

[63] Continuation of Ser. No. 880,129, Feb. 22, 1978, abandoned.

[30] Foreign Application Priority Data

Feb. 24, 1977 [JP] Japan ................................. 52/18634

[51] Int. Cl.$^3$ ................................................ B29F 3/04
[52] U.S. Cl. .................................. 425/198; 264/209.1; 425/199; 425/376 A; 425/380; 425/462; 425/464
[58] Field of Search ............................... 425/461–462, 425/463, 464, 376 R, 376 A, 380, 382 R, 466, 197–199; 264/209, 177 R

[56] References Cited

U.S. PATENT DOCUMENTS

| 3,836,302 | 9/1974 | Kaukeinen | 425/197 |
| 3,947,214 | 3/1976 | Cunningham | 425/467 |
| 3,981,657 | 9/1976 | Orso et al. | 425/198 |
| 4,008,033 | 2/1977 | Folmar et al. | 425/467 |

FOREIGN PATENT DOCUMENTS 50-29922 9/1975 Japan .

Primary Examiner—Jeffery R. Thurlow
Attorney, Agent, or Firm—Stevens, Davis, Miller & Mosher

[57] ABSTRACT

Extrusion die assembly for forming honeycomb structures, which comprises a die having a discharge surface provided with grid-shaped slits for discharging a honeycomb shaped body and an inlet surface provided with a plurality of independent feed inlets, a mask having an orifice for determining the outer shape and dimension of the extruded honeycomb structure and a ring having an orifice for restraining supply of the batch material into the feed inlets at the periphery of the inlet surface.

7 Claims, 6 Drawing Figures

EXTRUSION DIE ASSEMBLY FOR FORMING HONEYCOMB STRUCTURES

This is a continuation of application Ser. No. 880,129, filed Feb. 22, 1978, now abandoned.

The present invention relates to an extrusion die assembly for forming honeycomb structures and more particularly to an extrusion die assembly for forming honeycomb structures which can extrude honeycomb structures having a plurality of outer shapes by means of a single die and which is low in local abrasion and can be used stably for a long period of time.

Ceramic honeycomb structures in which a large number of channels are integrally formed adjacently in parallel by partitions having substantially uniform thickness have been recently particularly used for catalyst supports for removing $NO_x$ in exhaust gas from various combustion furnaces, for purifying exhaust gas from internal combustion engines and for removing the odor of exhaust gas in factories.

Figure 1:
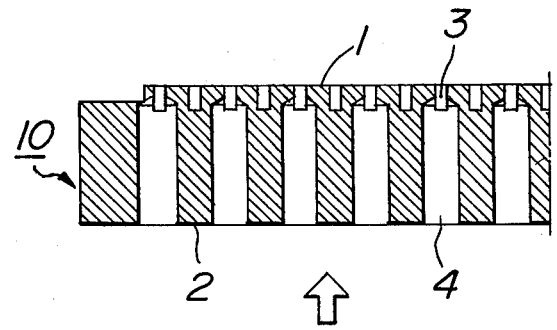

Extrusion die 10 for forming ceramic honeycomb structures, which are formed by extrusion molding and used for various catalyst supports, have generally the construction as shown in FIG. 1 and include a discharge surface 1 and an inlet surface 2, said discharge surface being provided with grid-shaped slits 3 having a given depth and forming and discharging a honeycomb structure composed of interconnected thin partitions having substantially uniform thickness and said inlet surface being provided with a plurality of independent feed inlets 4 communicating with cross points or sides of the grid-shaped slits.

However, in the extrusion die having the construction as shown in FIG. 1, the outer shape and dimension of the formed honeycomb structure are necessarily determined by the dimension of the die and when the honeycomb structures having different outer shapes and dimensions are required, it is necessary to prepare extrusion dies conforming to such honeycomb structures, so that equipping extrusion dies with the required number is very expensive and this is commercially very disadvantageous.

Figure 2:
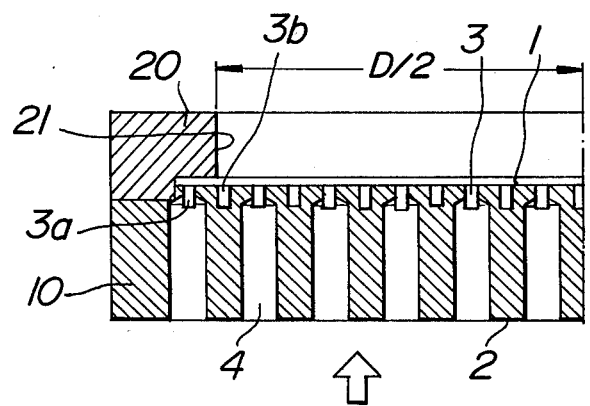

Accordingly, for example, the extrusion die assembly for forming a honeycomb structure as shown in FIG. 2, which can manufacture honeycomb structures having different outer shapes by means of a single extrusion die, has been known. In the extrusion die assembly for forming a honeycomb structure as shown in FIG. 2, a mask 20 having an orifice 21 of a given diameter D is provided at the discharge surface 1 of the die 10 and accordingly the outer shape of the extruded honeycomb structure is determined by the shape of the orifice 21 of the mask 20. However, in such extrusion die assembly provided with the mask 20, the extrusion resistance at the periphery portion of the die blocked by the mask 20 necessarily becomes larger, so that it is difficult to extrude the whole batch material at a uniform rate and further the batch material passing through discharge slits 3a blocked by the mask 20, which is higher in the extrusion resistance due to the presence of the mask 20, moves to the discharge slits 3b not blocked by the mask 20 where the extrusion resistance is lower, so that the discharge slits 3a blocked by the mask 20 and the discharge slits 3b near the mask 20 are subjected to a high friction force owing to the batch material and abrasion is locally caused at the discharge slits 3 due to the use for a long period of time and accordingly nonuniformity of the partition thickness is caused in the extruded honeycomb structure, so that in the subsequent steps, cracks are caused by drying and firing and the product becomes nonuniform.

The extrusion die assembly for forming honeycomb structures according to the present invention has obviated the drawbacks and problems in the conventional extrusion die assembly, can extrude honeycomb structures having various outer shapes and dimensions by a single extrusion die, is low in local abrasion of die and can be used stably for a long period of time.

This extrusion die assembly includes a discharge surface and an inlet surface, said discharge surface being provided with grid-shaped slits for discharging a honeycomb structure composed of interconnecting thin partitions and said inlet surface being provided with a plurality of independent feed inlets which communicate with cross points or sides of the grid-shaped slits, a mask having an orifice of a given diameter surrounding periphery of the discharge surface, by which the outer shape and dimension of the honeycomb structure is determined, and at least one ring having an orifice of a given diameter positioned on the inlet surface which restrains the rate of a batch material fed into the feed inlets at periphery of the inlet surface.

The present invention will be explained in more detail.

Figure 3:
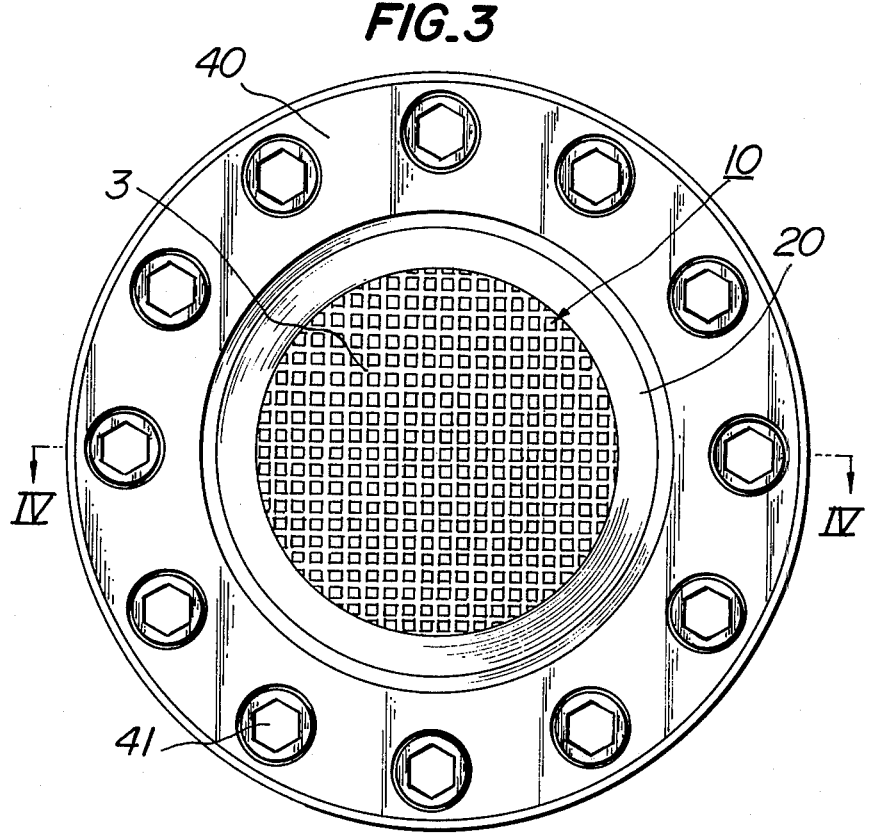
Figure 4:
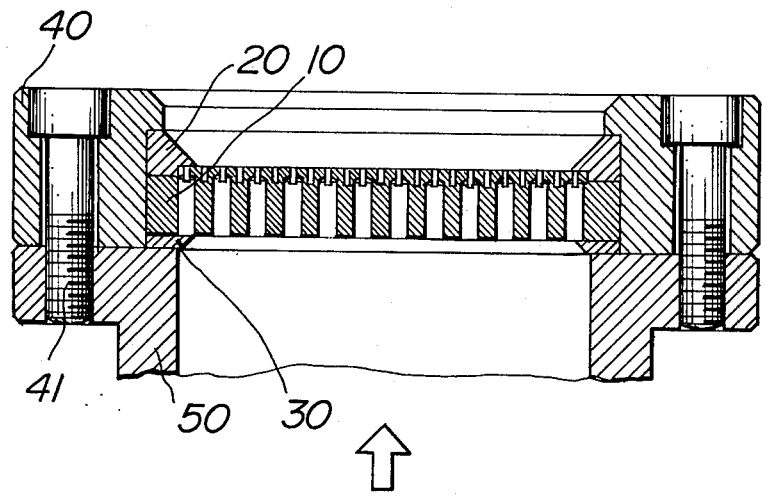
Figure 5:
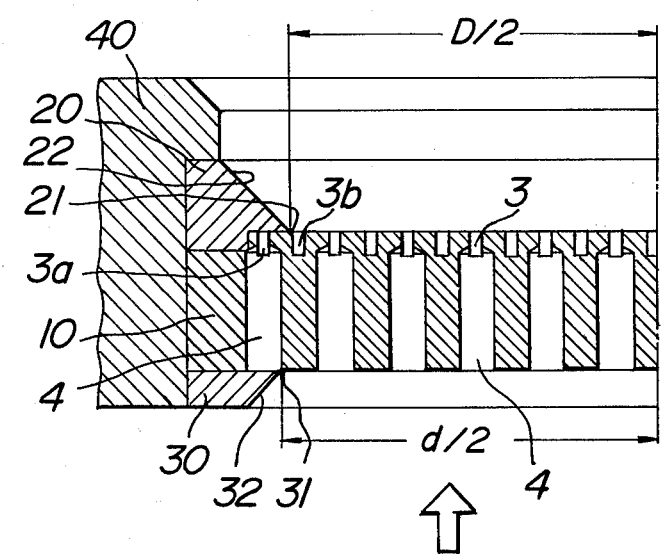
Figure 6:
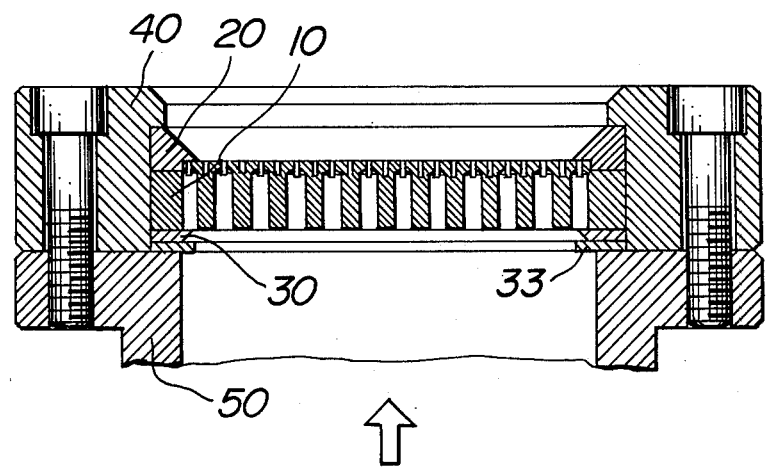

For a better understanding of the invention, reference is made to the accompanying drawings, wherein FIG. 1 is a cross-sectional view of a conventional extrusion die for forming a honeycomb structure in which the right half portion is omitted, FIG. 2 is a cross-sectional view of a conventional extrusion die assembly provided with a mask at the die shown in FIG. 1 in which the right half portion is omitted, FIG. 3 is a plan view of the extrusion die assembly for forming a honeycomb structure according to the present invention, FIG. 4 is a cross-sectional view taken along the line IV—IV in FIG. 3, FIG. 5 is an enlarged cross-sectional view of the essential portion of FIG. 4 in which the right half is omitted, and FIG. 6 is a cross-sectional view of another embodiment of the extrusion die assembly corresponding to FIG. 4.

The invention will be explained in detail with respect to an example shown by the drawings.

The extrusion die assembly for forming a honeycomb structure according to the present invention is provided at the open end of a barrel 50 of the extruder. In this case, as shown in FIGS. 3-5, a ring 30 having an orifice 31 of a given diameter d is allowed to abut to an end face of the barrel 50, a die 10 having the above described conventional structure is put on the ring 30 so that the ring 30 positions on an inlet surface of the die. A mask 20 having an orifice 21 of a given diameter D is provided surrounding a periphery of the discharge surface of the die and then the ring 30, the die 10 and the mask 20 are covered by a support structure 40 and the support structure is secured to the barrel 50 with bolts 41. The ring 30, the die 10 and the mask 20 are provided concentrically.

The batch material to be extruded is extruded in the direction shown by arrow in the drawings. The mask 20 has an orifice 21 of a given diameter of D and the outer shape and the dimension of the extruded honeycomb are determined by the diameter D. The mask may be circular, oval or other desired orifice shapes. The mask 20 is preferred to have a surface capable of tightly abutting the discharge surface 1 of the die 10 and it is preferable that the orifice 21 is provided with a tapered outlet portion 22 so as to make the friction between the extruded honeycomb structure and the mask 20 low.

The ring 30 has an orifice of a given diameter d and blocks the feed inlets at the periphery portion of the inlet surface of the die 10 and restrains an amount of the batch material to be fed to the discharge slits at the periphery of the die 10, particularly the discharge slits blocked by the mask 20. It is preferable that the orifice 31 of the ring 30 is provided with a tapered inlet portion 32 to reduce the friction between the batch material to be extruded and the ring 30. The diameter of the orifice 31 of the ring 30 is varied depending upon the diameter D of the orifice 21 of the mask 20. For example, when it is intended to supply batch material to be extruded to the periphery portion of the die 10, the diameter d of the orifice 31 is made larger than the diameter D of the orifice 21 of the mask 20 and when it is intended to supply batch material to be extruded in a smaller amount to the periphery portion of the die 10, the diameter d of the orifice 31 is made to be smaller than the diameter D of the orifice 21. In order to make the strength at the outer periphery of the honeycomb structure sufficiently high, it is preferably that the diameter d of the orifice 31 of the ring 30 is made larger than or equal to the diameter D of the orifice 21 of the mask 20.

When a ceramic catalyst support for purifying the internal combustion engine is extruded, the width of the discharge slits is not more than 0.3 mm and the diameter of the feed inlets is about 1.0–2.0 mm.

Furthermore, the number of the rings is not limited to one and, for example, as shown in FIG. 6 reference numerals 30 and 33, said number may be two or more. By making the number of the rings plural, the friction between the batch material supplied to the periphery of the die 10 and the ring 30 is reduced.

In the example shown in FIG. 6, the rings 30 and 33 contact each other but may be separated.

In the example shown by the drawings, the grid of the discharge slits is square but the discharge slits may be circular, triangular, tetragonal, pentagonal, hexagonal or octagonal any of the other desired grids.

As mentioned above, the extrusion die assembly for forming honeycomb structures according to the present invention can easily manufacture honeycomb structures having various outer shapes and dimensions by using one die and selecting the shape and dimension of the mask and the ring. The local abrasion of the die is low and the extrusion die assembly can be used for extrusion molding of ceramic honeycomb structures, particularly for various catalyst supports, and is commercially very useful.

What is claimed is:

1. In an extrusion die assembly for forming honeycomb structures comprising a die including a discharge surface provided with grid-shaped slits for discharging honeycomb structures composed of interconnecting thin partitions and an inlet surface provided with a plurality of independent feed inlets communicating with the grid-shaped slits and a mask having an orifice of a given diameter, by which an outer shape and a dimension of the honeycomb structure are determined, said mask being adjacent to the grid shaped slits in a discharge direction and surrounding a periphery of the discharge surface, the improvement comprising providing at least one ring having an orifice of a given diameter surrounding a periphery of the inlet surface, said orifice of the ring restraining the supply of a batch material to the feed inlets at the periphery of the inlet surface and the ring and the mask being aligned with each other in the discharge direction, wherein said ring contacts the inlet surface and closes the feed inlets at the periphery of the inlet surface, and wherein the strength of the periphery portion of the honeycomb structure varies according to the diameter difference of the orifices of the mask and the ring.

2. The extrusion die assembly as claimed in claim 1, wherein there is only one ring.

3. The extrusion die assembly as claimed in claim 2, wherein the diameter of the orifice of the ring is larger than the diameter of the orifice of the mask.

4. The extrusion die assembly as claimed in claim 2, wherein the diameter of the orifice of the ring is substantially equal to the diameter of the orifice of the mask.

5. The extrusion die assembly as claimed in claim 2, wherein the orifice of the ring has a tapered inlet portion.

6. The extrusion die assembly as claimed in claim 1, wherein the orifice of the mask has a tapered outlet portion.

7. The extrusion die assembly as claimed in claim 1, wherein the number of rings is two.

* * * * *